(12) United States Patent
Raskar

(10) Patent No.: US 11,061,977 B1
(45) Date of Patent: Jul. 13, 2021

(54) BROADCASTING SYSTEM WITH INTEGRATED SOCIAL NETWORKING

(71) Applicant: Facebook, Inc., Menlo Park, CA (US)

(72) Inventor: Ramesh Raskar, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 256 days.

(21) Appl. No.: 16/235,844

(22) Filed: Dec. 28, 2018

Related U.S. Application Data

(60) Provisional application No. 62/611,841, filed on Dec. 29, 2017.

(51) Int. Cl.
*G06F 16/9535* (2019.01)
*G06Q 50/00* (2012.01)
*H04L 29/06* (2006.01)
*G06F 16/9536* (2019.01)

(52) U.S. Cl.
CPC ...... *G06F 16/9535* (2019.01); *G06F 16/9536* (2019.01); *G06Q 50/01* (2013.01); *H04L 65/4076* (2013.01)

(58) Field of Classification Search
CPC ............. G06F 16/9535; G06F 16/9536; G06F 16/24578; G06F 3/048; G06F 3/0482; G06F 16/735; G06F 16/635; G06F 16/68; G06F 16/738; G06F 16/9038; G06Q 50/01; G06Q 30/0269; G06Q 30/0255; G06Q 30/0631; H04L 65/4076; H04L 51/32; H04L 65/4084; H04L 51/10; H04L 67/22; H04L 65/1089; H04L 67/02; H04N 21/44204; H04N 21/8355

USPC ........................................................ 707/734
See application file for complete search history.

(56) References Cited

U.S. PATENT DOCUMENTS

| | | | |
|---|---|---|---|
| 8,719,347 B1 * | 5/2014 | Tomkins | G06F 16/951 709/204 |
| 2013/0110978 A1 * | 5/2013 | Gordon | H04N 21/4627 709/218 |
| 2013/0166580 A1 * | 6/2013 | Maharajh | H04W 4/18 707/758 |
| 2013/0290110 A1 * | 10/2013 | LuVogt | G06F 16/9535 705/14.66 |
| 2017/0048184 A1 * | 2/2017 | Lewis | H04L 51/10 |

* cited by examiner

*Primary Examiner* — Evan Aspinwall
(74) *Attorney, Agent, or Firm* — Baker Botts L.L.P.

(57) ABSTRACT

In one embodiment, a method includes receiving data associated with the user from a content rendering device associated with a user of an online social network, where the content rendering device receives signals from a broadcast service provider system, identifying personalized content items that are of interest to the user based at least on the received data associated with the user, sending the identified personalized content items to the content rendering device, where the identified personalized content items are used by the content rendering device to determine which content items to cache, ranking content objects in the online social network based at least on the identified personalized content items, sending one or more content objects that have higher ranks than the other content objects to the broadcast service provider system, where the one or more content objects are sent to the content rendering device by the broadcast service provider system.

20 Claims, 8 Drawing Sheets

BROADCASTING SYSTEM WITH INTEGRATED SOCIAL NETWORKING

PRIORITY

This application claims the benefit, under 35 U.S.C. § 119(e), of U.S. Provisional Patent Application No. 62/611,841, filed 29 Dec. 2017, which is incorporated herein by reference.

TECHNICAL FIELD

This disclosure generally relates to use of a social-networking system for media content selection.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include information that the user has entered. The information may be public or private, depending on the user's privacy settings, and may include communication-channel information, and information on personal interests of the user. The social-networking system may also, with input and permission from a user, provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In some parts of the word, access to the Internet and smartphones is scarce. However, people in these parts of the world do typically have access to traditional over-the-air (OTA) or satellite broadcasting systems (e.g., broadcast television (TV) or broadcast radio), which broadcast the same content (e.g., programming) to multiple receivers on designated transmission channels. In embodiments, a system is provided that integrates into existing broadcasting system infrastructures, and introduces online social networking, personalized content selection, and an internet experience to people who may otherwise not have access to such services.

In embodiments, a set-top box collects personal user data (e.g., a history of interactions between a user and the set-top box) in accordance with privacy settings specified by each user associated with the set-top box and transmits the collected data associated with a user to a social-networking system to the extend allowed by the user. If a user has a mobile phone, and if the user allows the set-top box to send data via the mobile phone, then the set-top box may send its collected data via the mobile phone to the social-networking system. If the set-top box has its own uplink communication capability, such as having access to a (dial-up) modem, then the set-up box may send its collected data directly to the social-networking system. The social-networking system may, in accordance with privacy settings specified by the user, use the received personal user data to create a personalized list of content items (e.g., media items) that may be of interest to the user. The social-networking system may, in accordance with privacy settings specified by the user, provide this personalized list to a broadcast partner (a provider of traditional broadcasting services) or to the set-top box. The broadcast partner may use an ID tag to associate a specific set-top box (or user) to select content items, as listed in the personalized list of content items, or gather the select contents items into a file package, with appropriate ID tag, and broadcast the content items (or file package). The set-top box may use the ID tag to identify content directed to it, and store (cache) the identified content items to an internal data storage device. In embodiments, the personalized list may be sent to the set-top box, and the set-top box itself sorts through broadcast content and caches content items identified in the personalized list. In either case, the social-networking system may, in accordance with privacy settings specified by the user, provide content items (such as newsfeeds, posts, and cached portions of the internet), either directly or through a third-party system, to the broadcast partner for broadcasting. In embodiments, the broadcaster may send the personalized content items to the set-top boxes during off-peak hours, such as at night, for off-line viewing.

In this manner, the personalized content items sent to the set-top box may, subject to privacy settings specified by the user, include, for example, regular broadcast programming, videos, news media, newsfeeds, maps, photos, public posts made to the social-networking system, and a subset of the internet, which may be based on cached local data (for example, local to the user's geographic area).

In embodiments, multiple set-top boxes may be gathered into groups (mesh networks). Each group may include a designated set-top box that has a receiver/tuner to receive broadcast signals (such as satellite broadcast signals), and the other set-top boxes in the group may be non-tuner set-top boxes (i.e., lack any receiver/tuner). The set-top boxes in each group may be linked by a wireless communication link (such as a local Wi-Fi network) and share the one receiver in the designated set-top box. In operation, each set-top box in a group may have its own ID and maintain, in accordance with privacy settings specified by its respective user, its own user interaction data. The designated set-top box may gather user interaction data from the non-tuner set-top boxes and transmit the gathered user interaction data to the social-networking system, which may create a personalized content list for each set-top box in the group in accordance with privacy settings specified by respective user of the set-top box. In embodiments, the social-networking system may create a group personalized content list from an amalgamation of user interaction data from multiple set-top boxes in a group.

In embodiments, the designated set-top box may cache the personalized content items for multiple set-top boxes in its group. In operation, the designated set-top box may send or stream personalized content items to the non-tuner set-top boxes in its group. In embodiments, a group of set-top boxes may be distributed across multiple premises, such as a group of neighborhood homes, offices, or school classrooms.

In particular embodiments, the social-networking system may, in accordance with privacy settings specified by the user, receive data associated with a user from a content rendering device associated with the user of an online social network. The data associated with the user may comprise user descriptive data or interaction data between the user and the content rendering device. The user descriptive data may comprise social group memberships, social demographic information, or local geographic information. The interaction data between the user and the content rendering device may comprise content viewing history, questionnaire data, posts, like submissions, or dislike submissions. The content rendering device may collect user descriptive data or interaction data between the user and the content rendering device in accordance with privacy settings specified by the user. The content rendering device may receive signals for media content from a broadcast service provider system. The content rendering device may render media content to a media device associated with the user based on the received signals. The media device may comprise a television, a radio, a tablet, or a computer. The social-networking system may identify personalized content items that are of interest to the user based at least on the received data associated with the user. The identifying the personalized content items may be further based on user-profile data or on a social graph available in the online social network in accordance with privacy settings specified by the user. The identifying the personalized content items may be done by a machine-learning algorithm. The social-networking system may send the identified personalized content items to the content rendering device in accordance with privacy settings specified by the user. The identified personalized content items may be used by the content rendering device to determine which content items to cache. The content rendering device may determine whether to cache a content item based at least on the personalized content items received from the social-networking system. The content rendering device may present a list of cached content items to the user. The content rendering device may present a cached content item to the user upon receiving a request for the cached content item from the user. The social-networking system may rank content objects in the online social network based at least on the identified personalized content items. The content objects, subject to privacy settings specified by the user, may comprise newsfeeds, posts, pictures, videos, local news, maps, or a subset of the Internet. The social-networking system may send one or more content objects that have higher ranks than the other content objects to the broadcast service provider system. The one or more content objects may be sent to the content rendering device by the broadcast service provider system. The broadcast service provider system may send the one or more content objects to the content rendering device during off-peak hours.

In particular embodiments, the social-networking system may, subject to privacy settings specified by the user, send the identified personalized content items and an identifier corresponding to the user to the broadcast service provider system. The broadcast service provider system may tag content items belonging to the personalized content items with the identifier corresponding to the user. The content rendering device may determine that the tagged content items belong to the personalized content items based on the identifier.

In particular embodiments, the content rendering device may be associated with more than one users of the online social network. The content rendering device may be connected to a plurality of sub-rendering devices, wherein each of the plurality of sub-rendering devices is associated with a user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In some parts of the word, access to the Internet and smartphones is not widely available. Nonetheless, people in such parts of the world typically do have access to traditional over-the-air (OTA) (e.g., terrestrial or satellite) broadcasting systems (e.g., broadcast television (TV) or broadcast radio), which broadcast the same content (e.g., programming) to many receivers on a designated transmission channel. That is, traditional broadcasting systems have an asymmetric pipe, i.e. communication flows in one direction from the broadcaster to the receivers. These types of broadcastings systems therefore lack personalization to individual receivers. Herein is provided a system/method by which to provide personalized information (i.e. media content items or sponsored content items or recommendations) to individual users (e.g., TV viewers or households) using traditional broadcasting systems. The term "content item" may refer to any item that may be consumed by the user (e.g., a video/photo, an audio file, a slide deck, a newsfeed, a user post, textual information).

In embodiments, a set-top box, such as used to render media content to a television or radio, may gather user data, such as user-descriptive data or user-interaction data in accordance with privacy settings specified by each user associated with the set-top box, and sends the gathered user data to a social-network system to the extent allowed by the user, like Facebook, (760, see below) which may, in accordance with privacy settings specified by the user, use the user data to identify media content of interest to the user. The set-top box receives broadcasts signals (e.g., TV broadcasts), including the identified media content, and caches the identified media content for later off-line viewing by the user. In this manner, a personalized video streaming experience is provided to people via their traditional over-the-air (television or radio) receiver. This experience is made similar to a TV program broadcasting experience, except that it may be customized for targeted audiences by the social-network system.

Figure 1:
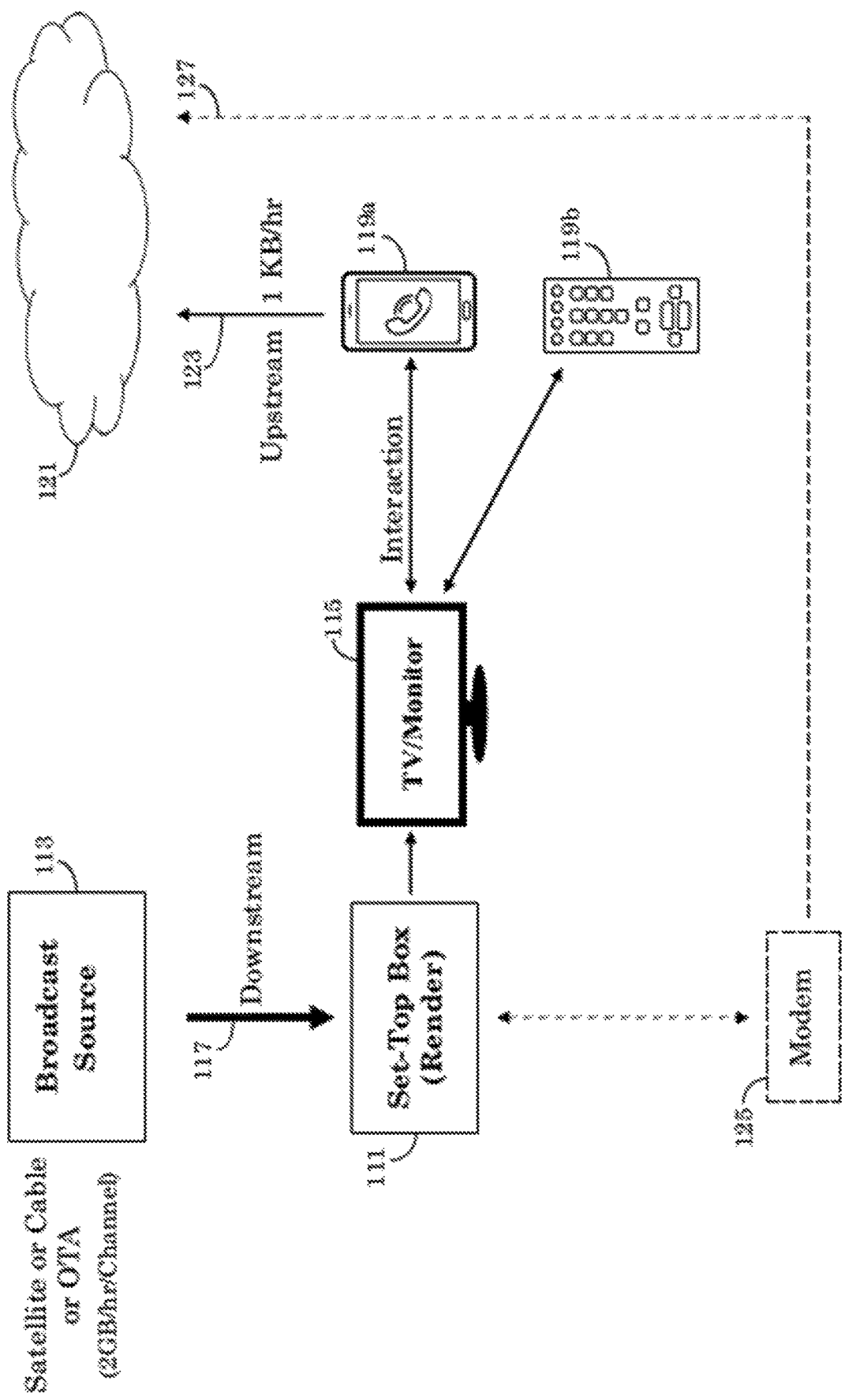
FIG. 1 provides an overview of an example system by which to provide personalized broadcast content to individual users.

FIG. 1 provides an overview of an example system by which to provide personalized broadcast content to individual users. In the present example, a content-rendering device, such a set-top box (STB) 111, capable of receiving television or radio broadcasts from a broadcast source 113 may be used as an intermediary to provide a personalized experience to an individual user. In the present example, the broadcast source is assumed to be a television broadcast source, which may use any of multiple known broadcast methods, such as satellite, cable, or over-the-air (OTA). The set-top box 111 may render rendered content items onto a television 115. The broadcast source 113 provides a large downstream path 117 of content to set-top box 111. In embodiments, a full day's amount of broadcast data may be large, e.g. 100 GB to 400 GB, and typically is more than can be stored by within set-top box 111. Although, set-top box 111 may have limited onboard memory (e.g., limited to 10 GB), set-top box 111 may still provide a full day's amount of personalized viewing (e.g., broadcast data) to users by use of predictive (e.g., personalized) data selection without downloading content via Internet or mobile phone services. That is, set-top box 111 only needs to cache a fraction of the full day's amount of broadcast data that may be of interest to the user.

In operation, a mobile phone/Wi-Fi/Bluetooth device 119a capable of running an app for communicating with set-top box 111 or a remote control 119b, such as a TV or DVD remote control device, may, in accordance with privacy settings specified by the user associated with the mobile phone/Wi-Fi/Bluetooth device 119a, provide preference-indicating inputs such as like, skip, or share that may be integrated into a social graph (an example of which is provided below), which may be managed by the social-network system. The preference indicating inputs may be recorded by the set-top box 111 in accordance with privacy settings specified by each user and optionally loaded (sent) to the social-network system to the extent allowed by the user at designated times, or time intervals.

Communication between the set-top box 111 and the social-network system (which may be on the Internet and is herein represented as being accessible via a network cloud 121) may be conducted via a data pipeline provided by a communication partner system, such as a satellite or a cable communication system. Alternatively, if a mobile phone 119a with Internet access is available, and if the user allows the set-top box to send data via the mobile phone 119a, then an upstream path 123 from mobile phone 119a to the social-network system may be used to send user-interaction history data recorded by set-top box 111. The user-interaction history data may, subject to privacy settings specified by the user, include content viewing history, questionnaire data, posts, like/dislike submissions, social group memberships, social demographic information, local geographic information, etc. Further alternatively, if the set-top box 111 has direct Internet access, such a through an (internal or external) modem (125), then the set-top box 111 may communicate with the social-network system directly using its own upstream path 127. Thus, the set-top box 111, singularly or in combination with mobile phone 119a or remote control 119b, may constitute a client system 730, as described below.

The social-network system may, in accordance with privacy settings specified by the user, use the collected user-interaction history data and optionally also use other user-related sources, such social graph data, to select/identify/predict, in accordance with privacy settings specified by the user, personalized content items that may be of interest to the user, and communicate a list of identified content items to the set-top box 111 or to the broadcast source. For example, the social graph may be used to suggest content liked by a friend of the current user on the social graph, if privacy settings specified by the friend allow the social-network system to access the social graph for identifying content for the current user, where the term "friend" may refer to any other user of the social-networking system with whom the current user has formed a connection, association, or relationship via the social-networking system. Determination of whether to use, or how much weight to give to, a friend's recommendations may be based on a social-graph affinity (described below) of the friend relative to the user.

If the list of identified content items is communicated to the broadcast source, then the broadcast source may tag the selected content items with an identifier corresponding to the user or the user's set-top box 111, which the set-top box 111 may use to identify content items (received via downstream pipeline 117) for internal caching. If the list of identified content items is communicated to the set-top box 111, then the set-top box may use the list to identify content items (among a broadcast of multiple content items) for internal caching. In either case, the social-networking system may, in accordance with privacy settings specified by the user, provide additional content items (such as newsfeeds, posts, and cached portions of the internet), either directly or through a third-party system, to the broadcast source 113 for broadcasting. The broadcast source 113 may transmit the content items (e.g., as part of a total day's broadcast content data) during off-peak hours, such as at night (e.g. when viewers may be sleeping, or otherwise not watching television), for later rendering for viewing by the set-top box 111. In this manner, if the user selects to watch a content item that is already cached within the set-top box 111, then the selected content item may be rendered and viewed offline, i.e. without use of the downstream pipeline 117. In summary, the personalized content items may include personalized selections from a day's typical broadcast, a personalized newsfeed, select product sponsors, etc.

Optionally, the set-top box may be limited to storing a fraction of the day's broadcast. For example, although the day's broadcast may be 400 GB, the set-top box may be limited to storing only a select (personalized) 10 GB of the 400 GB. This may be accomplished by the social-network system filtering a select 10 GB for transmission to a particular set-top box. Alternatively, the 400 GB may be transmitted to an individual set-top box, and the individual set-top box may select 10 GB among the received 400 GB to store internally. During viewing (e.g., televised content rendering), a content selection application within the set-top box 111 may generate a program schedule and select content items (such as in 1 GB segments) among the stored 10 GB for display to the viewer's television set 115.

The above example makes it possible to link together previously unconnected TV owners, such as farmers, merchants, and various social groups. As is explained above, although Internet access may not be widespread in some parts of the world, typically broadcast services such as television and radio are generally well-established. Worldwide 89% have access to television, and it is the primary digital experience for the emerging world. For example, more than half the TVs in India have a set-top box (Cable TV or Direct-To-Home, DTH, Satellite). The present system therefore provides an introduction to the Internet and social networking for a populous that may be unfamiliar with such technologies.

Two barriers to Internet adoption in emerging markets are relevance and technical skills. Many people are uninformed regarding how to use an Internet-capable device/interface and may have little interest in a new or foreign concept such as the Internet. However, a majority of people in emerging markets are familiar with, and understand, television. Therefore, television may provide a convenient vehicle to introduce Internet connectivity and Internet tools such as social-networking systems (e.g., Facebook). That is, television overcomes both the relevance and skills barrier faced by many.

In embodiments, existing TV satellite/cable/terrestrial infrastructure may be used to send hundreds of gigabits of data using a predictive push technique, which selects (i.e. predicts) content for later viewing that may be of interest to a viewer, or household. The productive push technique may push the selected content to a set-top box, where the selected content may be cached and later accessed locally (or via a mesh, i.e., a network mesh) for viewing. Based on local viewer (or user) behavior, the set-top box can assemble the content stored on the set-top box into a personalized media (e.g., audio-and-video content item, or pure audio content item, or pure visual content item) rendering experience.

Figure 2:
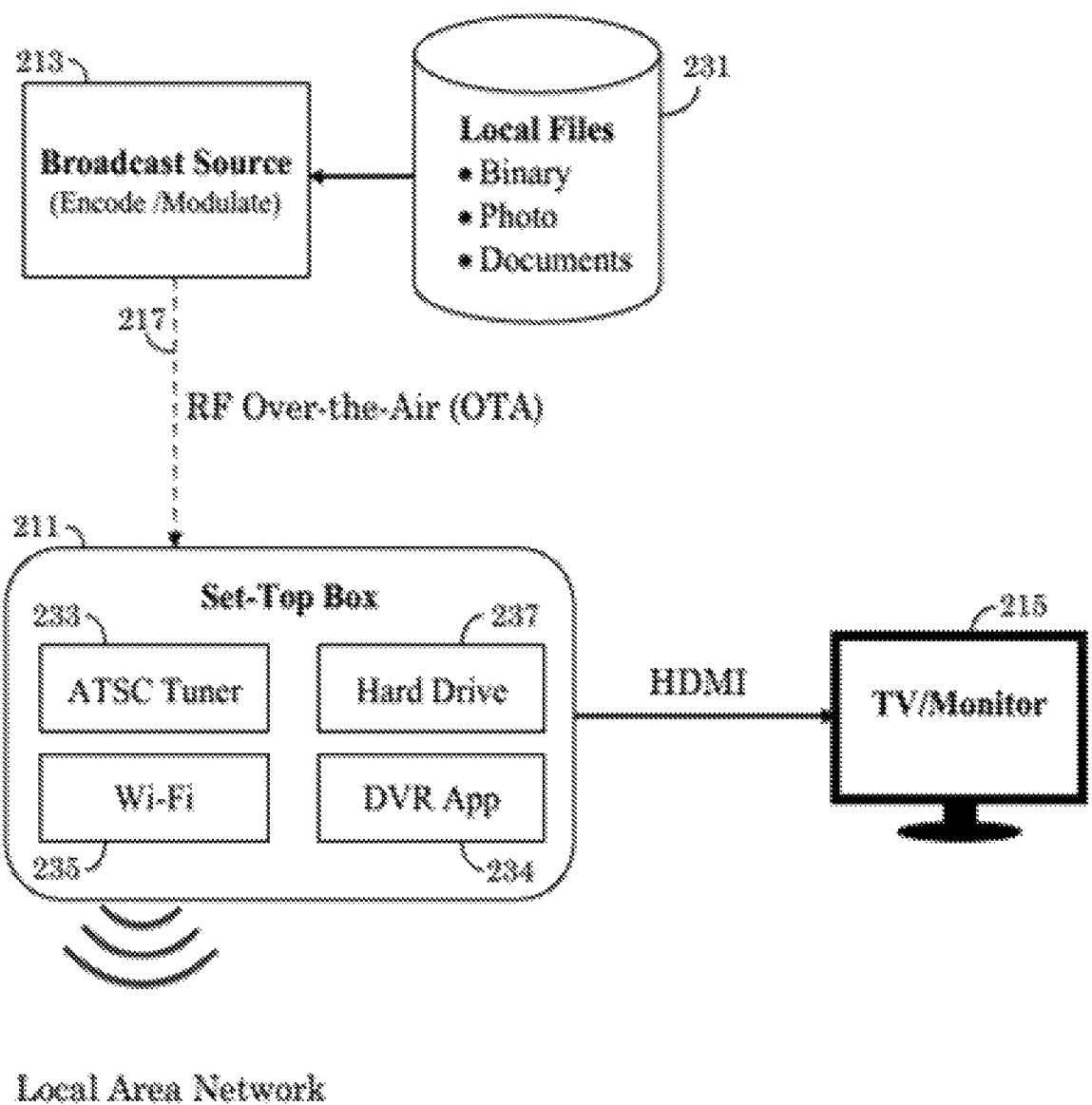
FIG. 2 provides an overview of another example system by which to provide personalized broadcast content to individual users.

FIG. 2 provides an overview of another example system by which to provide personalized broadcast content to individual users. In the present example, a broadcast source 213, which may have access to a depository (database) 231 of local files such as binary, photo/picture and document files, transmits content (i.e., content items) to a set-top box 211 by over-the-air (OTA) transmission. The broadcast source 213 may transmit different types of content to the set-top box 211. The transmitted content may include a mix of popular, short-form, internal content previously saved/collected/created by the social-networking system, live content (e.g., a live video broadcast) provided by the social-networking system, and licensed content (such as for prime time viewing) provided by various media outlets. Content items transmitted to set-top box 211 may also include (trending) photos and (Internet) posts from local public figures, celebrities, etc., both of which may be part of a newsfeed. The set-top box 211 may by itself (or with cooperation from the social-networking system) develop a display sequence (or programming schedule) to present its stored (cached) content items to a user (viewer).

In the example of FIG. 2, the set-top box 211 may include a digital television tuner 233 (e.g., Advanced Television Systems Committee, ATSC, tuner) for receiving content from broadcast source 213, a wireless network interface controller 235 (e.g., Wi-Fi interface controller) by which to communicate with a user hand-held communication device 219 (e.g., a mobile phone), a hard drive 237 on which to store received content items, and a content-rendering mechanism 233 (such as a digital video recorder (DVR) 234 or DVR app) by which to render viewable content onto television 215 by a suitable audio/video communication mechanism, e.g., by use of a High-Definition Multimedia Interface (HDMI).

In the present example, set-top box 211 receives content item files (e.g., pictures/photos, documents, binary files, videos, etc.) by OTA RF transmission, which defines downstream path 217. A content item file may be a single file that may include tens of photos, and may be in a compressed format, such a zip file, so the set-top box 211 would need to unpack it to the HDD 237. In embodiments, a content item file (or file package encapsulating multiple files) may have an upper bound size limit, such as 10 GB. The set-top box 211 may further be configured to store received data (e.g., content items) in the HDD 237, which may be internal or external to the set-top box 211. In some embodiment, 100 GB of data may be sent to (and stored by) the set-top box 211 every day. The set-top box 211 may further be configured to render data stored in the HDD for display on a TV 215. In particular embodiments, a software program (e.g., a daemon) may run on the set-top box 211 and control communications with user hand-held communication device 219, which may be implemented as a remote control or mobile phone and supports minimal functionality such as button, screen, and connection capability. User hand-held communication device 219 may communicate with the set-top box 211 via wireless communication, which may include radio frequency, infrared light, Bluetooth, or a local wireless network such as Wi-Fi. In the present example, user hand-held communication device 219 is implemented as a mobile phone that may function as a remote control and communicate with the set-top box 211 via Wi-Fi.

In the examples of FIGS. 1 and 2, a television 115/215 and hand-held communication device 119a/119b/219 may be used to provide screen interactions with the user. In embodiments, a mobile phone service (such as data communication on a 2G phone network) in a home may be used for light data communications (e.g. interactivity between the set-top box and the social-networking system), and the TV infrastructure (e.g., broadcast source 113/213 and transmission pipeline 117/217) may be used for heavy data communications (e.g. downloading large amounts of content data for rendering). That is, the set-top box may, subject to permissions of a viewer, use the viewer's mobile phone to communicate with the social-networking system. Alternatively, the set-top box may have its own upstream data path (i.e. the set-top box may have its own uplink capabilities), and not require use of the user's mobile phone.

The set-top box 111/211 may further provide an Internet user interface on the television 115/215 that provides the user with additional web browsing capabilities. In this case, the social-networking system may keep track the viewer's web browsing activities and build a more intensive user history to better provide personalized content items for display.

Optionally, the set-top box 211 may provide an on-screen registration process by which the user may register with the social-networking system. The set-top box may provide onscreen interactions, including a Quick Response code (QR code), Short Message Service (SMS) (e.g., text messages) or an instant messaging service. The set-top box 211 may also record a phone number associated with the user to facilitate user registration with the social-networking system. In embodiments, the set-top box 211 may, subject to permissions from the user, inform the social-networking system of what content was being viewed when (or immediately preceding) the user registering with the social-networking system. The social-networking system may then tie the content that caused the user to register/signup and use this information to improve personalized content selection.

The social-networking system may further make use of online interactions with the user outside of the set-top box environments of FIGS. 1 and 2. For example, the social-networking system may, in accordance with privacy settings specified by the user, make use of user demographics information obtained from the user when the user is interacting with the social-networking system online via a computer or mobile phone, and not with the set-top box.

Optionally, the social-networking system provides a social layer on the set-top box by which the user may interact with the TV as a social experience. The social layer may provide a place to interact, engage, and share with other (remote) users. In effect, the social layer may be a jumping off point for content seen on the TV screen and a place to explore (personal interests) deeper. As users engage with different types of TV content, the set-top box provides a platform for enabling different users to connect online around those types of TV content.

Figure 3:
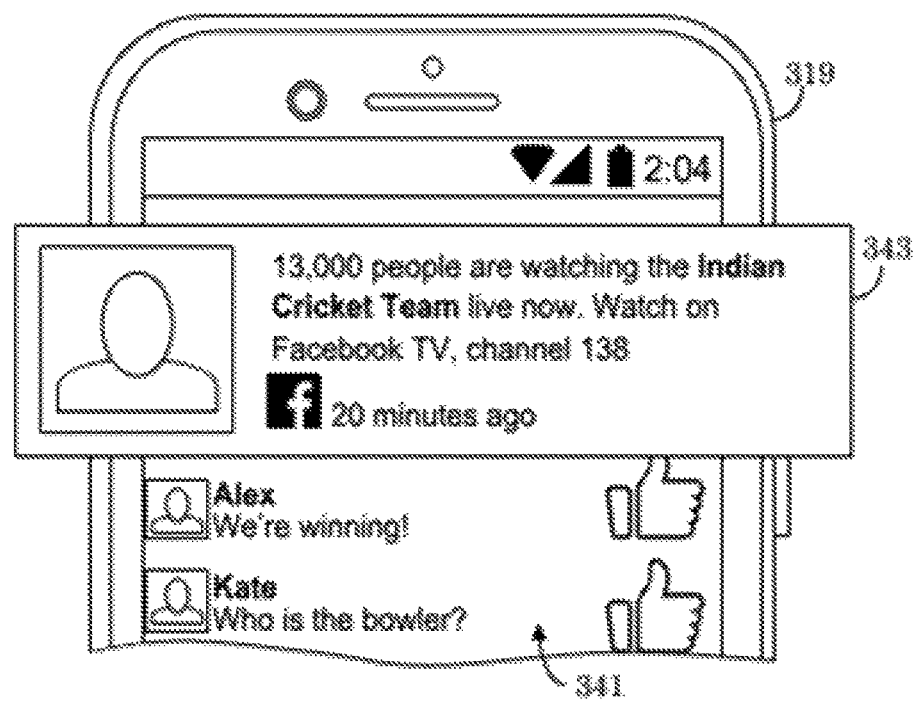
FIG. 3 illustrates a mobile phone with a user interface through which a user may interact with a social-network system.

When interacting with the social-networking system, either through the set-top box or via a mobile phone, the user may be made aware of related videos that may be viewed on the set-top box. For example, FIG. 3 illustrates a mobile phone 319 with an interface 341 through which a user may interact with the social-network system. Privacy settings specified by the user may allow the social-network system to provide notices 343. In the present example, the user is interacting with other users, or friends, on the social-networking system and discussing a sporting event. In response, the social-networking system may provide a notice 343 on interface 341 informing the user of a related video or televised sporting event that may be watched (accessed) via the set-top box and provide additional information such as a channel on which the sporting event may be viewed. This is of particular benefit when the portable device 319 is incapable of displaying the content (i.e. video) or downloading of such content would be prohibitively expensive. For example, if the user cannot watch video content provided by the social-networking system because of high data costs, or low screen resolution, the user may be notified that the content is available on TV via a specific channel on the set-top box. In this manner, the TV infrastructure of FIGS. 1 and 2 becomes a downstream pipe for the social-networking system and for the social layer on the set-top box.

The present system thus makes it possible to reach huge swaths of the world and provide personalized information from a social-networking system, like Facebook, on an otherwise static medium (e.g., broadcast television). As noted above, different types of content may be sent to set-top boxes, such as videos, news media, maps, photos, public posts made to the social-networking system, and a subset of the internet, which may be based on cached local data (for example, local to the user's geographic area). The present system thus provides an immersive experience that transcends language and literacy barriers and allows people to connect with each other locally and around the world, irrespective of a person's level of education or familiarity with high technology.

Figure 4:
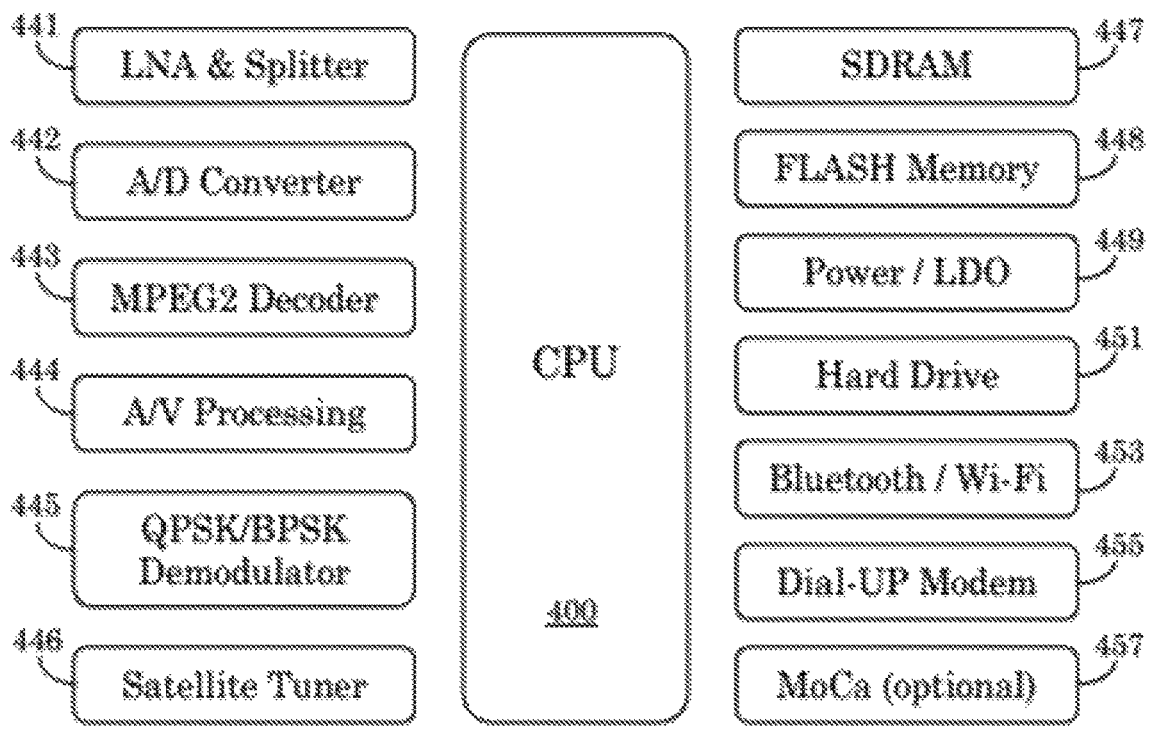
FIG. 4 illustrates an example internal make-up of an example set-top box.

FIG. 4 illustrates an example internal make-up of an example set-top box. As it would be understood, the internal make-up of a set-top box may vary depending upon its operating environment and its desired capabilities. For example, depending on the delivery mechanism (satellite, cable, terrestrial), in some embodiments, somewhere in the vicinity of 100 GB/day of content may be sent down to set-top boxes. In embodiments, the set-top box may a storage capacity to locally store all 100 GB of content or have a more limited storage capacity and store only a fraction of that content. In either case, the set-top box may assemble the stored content into a stream personalized to the user based on user preferences.

In embodiments, various techniques are contemplated for gleaning information for use in predicting content of interest to individual users. For example, the set-top box may record a description of a video (or broadcast show or another media content) watched by a user. This may include extracting keyword descriptors of the show, or using deep learning techniques (e.g., neural networks) to gain an understanding of displayed images and translate images or video to a text description for further analysis. Extracted objects, concepts, key words, or descriptions from the video permits the use of more traditional (e.g., machine learning) classification and recommendation techniques. Additional, social engagement and reactions, e.g., via the set-top box, may be interpreted as feedback signals for use in feed/ads ranking. Additionally, a user's show preferences may also be learned over time based on viewing habits. Using these sources of learning about a user (or household), the set-top box may gradually start providing viewing recommendations.

The example set-top box of FIG. 4 may be at least partially implemented as a System-On-Chip, SoC, system. The set-top box may include typical components found in a typical set-top box, such as a central processing unit (CPU) 400 to control the set-top box, and periphery circuitry. The periphery circuitry may include a low noise adaptor (LNA) and splitter 441, an analog-to-digital (A/D) converter 442, a video decoder 443 (e.g. Moving Picture Experts Group, MPEG2 decoder), audio and video processing component 444, a demodulator 445 (e.g., Quadrature Phase Shift Keying (QPSK)/Binary phase-shift keying (BPSK) demodulator), a tuner 446 (e.g. satellite tuner, ATSC tuner, etc.), volatile (integrated circuit, IC) memory 447 (e.g., synchronous dynamic random-access memory, SDRAM), non-volatile IC memory 448 (e.g., FLASH memory), and a power source 449 (e.g., power/low-dropout (LDO) regulator, e.g., a DC linear voltage regulator).

Additionally, the set-top box may further include a hard drive 451 (or other non-volatile memory). As is explained above, personalized content may be selected by the social-networking system and sent by broadcast via the existing TV infrastructure. Optionally, it may be downloaded during off-peak hours and stored/cached internally within the set-top box (such as in hard drive 451) for offline viewing. Caching personalized content for later viewing has an added effect of reducing traffic and cost on satellite TV services. As it would be understood, the size of the hard drive may depend on the size of the content to be stored. For example, 100 GB may support about 60 hours of DVD-quality movies, or 90 hours of VHS-quality video, or 60 days of around-the-clock MP3 audio, or 60000 digital photos.

In the above example, the set-top box may communicate with the social-networking system via an auxiliary device, such as a flip phone, using a Wi-Fi or Bluetooth connection 453. Alternatively, the set-top box may have its own uplink connection with the social-networking system via an optional (dial-up) modem 455 (or other communication device). In this case, the user may interact with the set-top box with a typical remote control (e.g., remote control device 119b of FIG. 1), and no mobile phone is needed. That is, the dial-up modem provides a mechanism by which the set-top box may access the Internet and submit feedback information (e.g. historical data related to a user or household) to the social-networking system that may be used to select personalized content items for the user or household (or neighborhood, as explained below). In embodiments, the set-top box may cache gathered user information and transmit the information to the social-networking system during off-peak hours, such as at night.

As another option, the set-top box may further include an optional MoCa 457 (Multimedia over Coax Alliance), which provides network access through a building's existing (co-axial) cable infrastructure.

In some embodiments, multiple set-top boxes may be distributed across multiple premises (e.g., homes, offices, school classrooms, etc.), and linked together into a mesh network (e.g. a wireless mesh network). The linked set-top boxes may then share cached content. In effect, each mesh network may constitute a group of set-top boxes that share content items among themselves so that set-top boxes in a group (or mesh network) do not need to cache duplicate copies of content items. In this manner, saved content can be meshed (distributed) to neighboring nodes (houses, offices, schools, etc.) for offline viewing.

In embodiments, one of the set-top boxes in a group (or mesh network) may be designated a satellite set-top box (having an internal receiver/tuner for receiving satellite signals) for receiving content via a satellite service, and the remaining set-top boxes in the group may lack a satellite receiver/tuner and be designated non-tuner set-top boxes. The non-tuner set-top boxes may receive content from the designated satellite set-top box and may have a simplified architecture. For example, the non-tuner set-top boxes may be implemented as primarily Wi-Fi+memory (SoC systems with limited processing power) units. Optionally, the designated satellite set-top box may cache content for the non-tuner set-top boxes in its group, and stream (or send) content items, as needed, to individual non-tuner set-top boxes. In this case, the non-tuner set-top boxes may omit the hard drive (or any large data storage unit) in their construct. This mesh network implementation may thus reduce the per-unit cost of the set-to-boxes.

The use of designated satellite set-top boxes with internal tuners in combination with non-tuner set-top boxes may provide additional cost savings by reducing the number of satellite TV service subscriptions needed for a mesh network.

Figure 5:
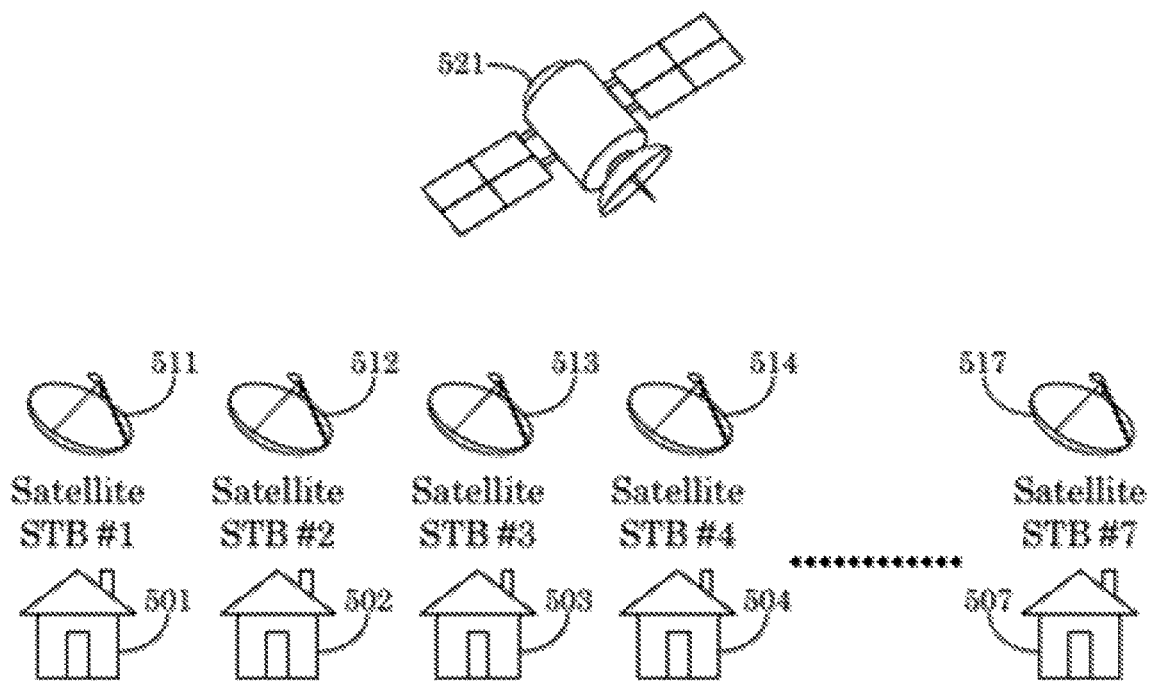
FIG. 5 illustrates an example implementation of seven set-top boxes having internal satellite receivers/tuners distributed across seven homes.

FIG. 5 illustrates an example implementation of seven satellite set-top boxes (STB 91 to STB 97) distributed across seven homes 501 to 507. In the present implementation, each of the seven satellite set-top boxes (STB 91 to STB 97) has its own satellite receiver/tuner, and thus each requires its own respective dish antenna 511 to 517 to receive satellite TV service via satellite 521. In the present implementation, the different set-top boxes (STB 91 to STB 97) may optionally form a (Wi-Fi) mesh network, and thereby share cached content items. In the present example, however, each satellite set-top box may accrue a separate monthly satellite TV service fee, which may complicate its implementation.

Figure 6:
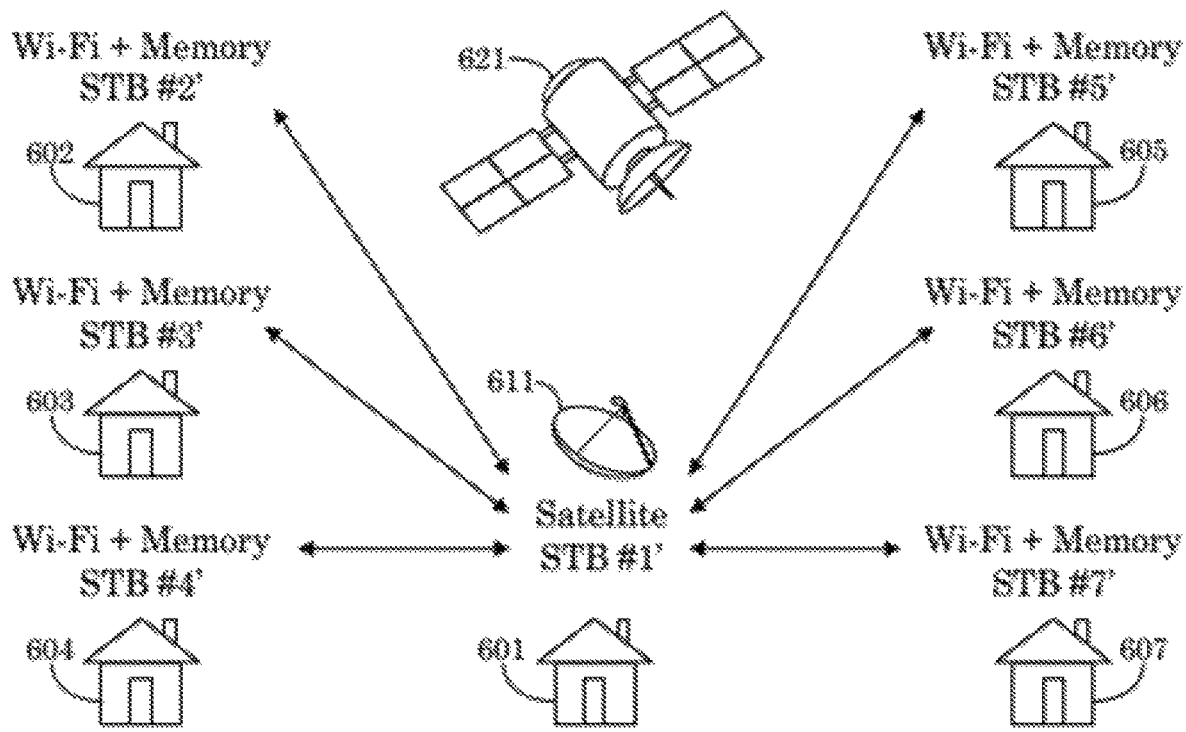
FIG. 6 illustrate an alternate example implementation wherein only one set-top box in a group of set-top boxes has an internal satellite receiver, and the remaining set-top boxes in the group lack a satellite receiver.

FIG. 6 illustrate an alternate example implementation wherein only one set-top box in a group (or mesh network) of set-top boxes has an internal satellite receiver/tuner and the remaining set-top boxes in the group are non-tuner set-top boxes (e.g., lack a satellite receiver/tuner). The present example again shows a group of seven set-top boxes (STB 91' to STB 97') distributed across seven homes 601 to 607. In present example, however, only set-top box STB 91' in home 601 is designated a satellite set-top box, and thus only one dish antenna 611 is needed for communication with satellite 621. In the present example, therefore, only one satellite TV service fee is accrued. In this example, the remaining six set-top boxes 602'-607' are non-tuner set-top boxes and may be implemented using the simplified Wi-Fi+memory (SoC) architecture and communicate with satellite set-top box STB 91' via Wi-Fi to receive content items from STB 91'. In this manner, the seven set-top boxes STB 91' to STB 97' may share the one satellite TV service of satellite set-top box STB 91'. In this case, each of the set-top boxes may have an associated, unique identifier by which their respective users may be identified and specialized content for each respective user may be identified and (at least temporarily) stored, or cached, in satellite set-top box 91'. It is to be understood that non-tuner set-top boxes STB 92' to STB 97' may also communicate with each other via the (Wi-Fi) mesh network and pass content items from one non-tuner set-top box to another.

Figure 7:
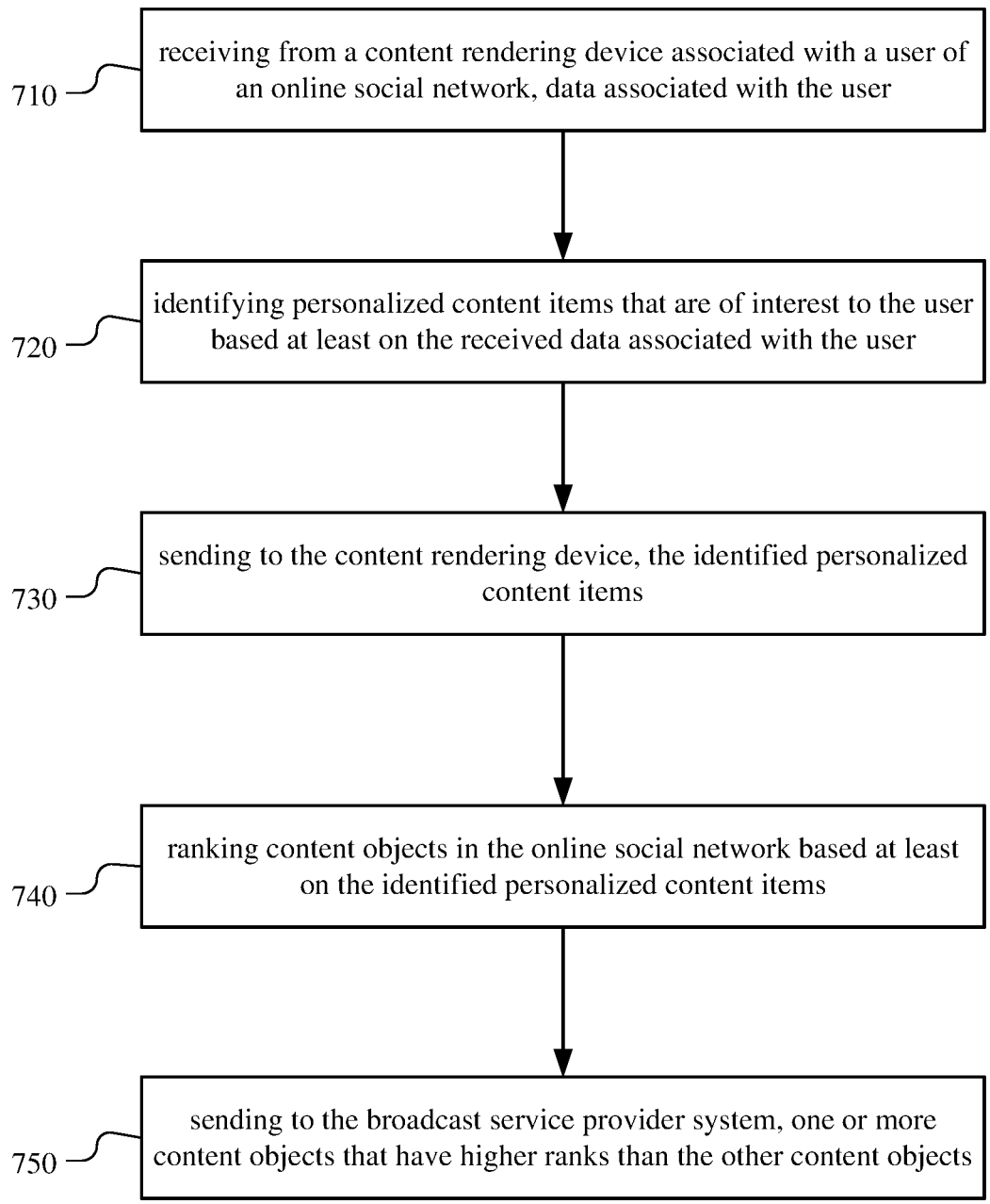
FIG. 7 illustrates an example method for providing one or more personalized content objects.

FIG. 7 illustrates an example method 700 for providing one or more personalized content objects. The method may begin at step 710, where the social-networking system 860 may, in accordance with privacy settings specified by the user, receive data associated with the user from a content rendering device associated with a user of an online social network. The data associated with the user may comprise user descriptive data or interaction data between the user and the content rendering device. The user descriptive data may comprise social group memberships, social demographic information, or local geographic information. The interaction data between the user and the content rendering device may comprise content viewing history, questionnaire data, posts, like submissions, or dislike submissions. The content rendering device may collect user descriptive data or interaction data between the user and the content rendering device in accordance with privacy settings specified by the user. The content rendering device may receive signals for media content from a broadcast service provider system. The content rendering device may render media content to a media device associated with the user based on the received signals. The media device may comprise a television, a radio, a tablet, or a computer. At step 720, the social-networking system 860 may, subject to privacy settings specified by the user, identify personalized content items that are of interest to the user based at least on the received data associated with the user. The identifying the personalized content items may be further based on user-profile data or on a social graph available in the online social network in accordance with privacy settings specified by the user. The identifying the personalized content items may be done by a machine-learning algorithm. At step 730, the social-networking system 860 may send the identified personalized content items to the content rendering device in accordance with privacy settings specified by the user. The identified personalized content items may be used by the content rendering device to determine which content items to cache. The content rendering device may determine whether to cache a content item based at least on the personalized content items received from the social-networking system 860. The content rendering device may present a list of cached content items to the user. The content rendering device may present a cached content item to the user upon receiving a request for the cached content item from the user. At step 740, the social-networking system 860 may rank content objects in the online social network based at least on the identified personalized content items. The content objects, subject to privacy settings specified by the user, may comprise newsfeeds, posts, pictures, videos, local news, maps, or a subset of the Internet. At step 750, the social-networking system 860 may send one or more content objects that have higher ranks than the other content objects to the broadcast service provider system. The one or more content objects may be sent to the content rendering device by the broadcast service provider system. The broadcast service provider system may send the one or more content objects to the content rendering device during off-peak hours. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for providing one or more personalized content objects including the particular steps of the method of FIG. 7, this disclosure contemplates any suitable method for providing one or more personalized content objects including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
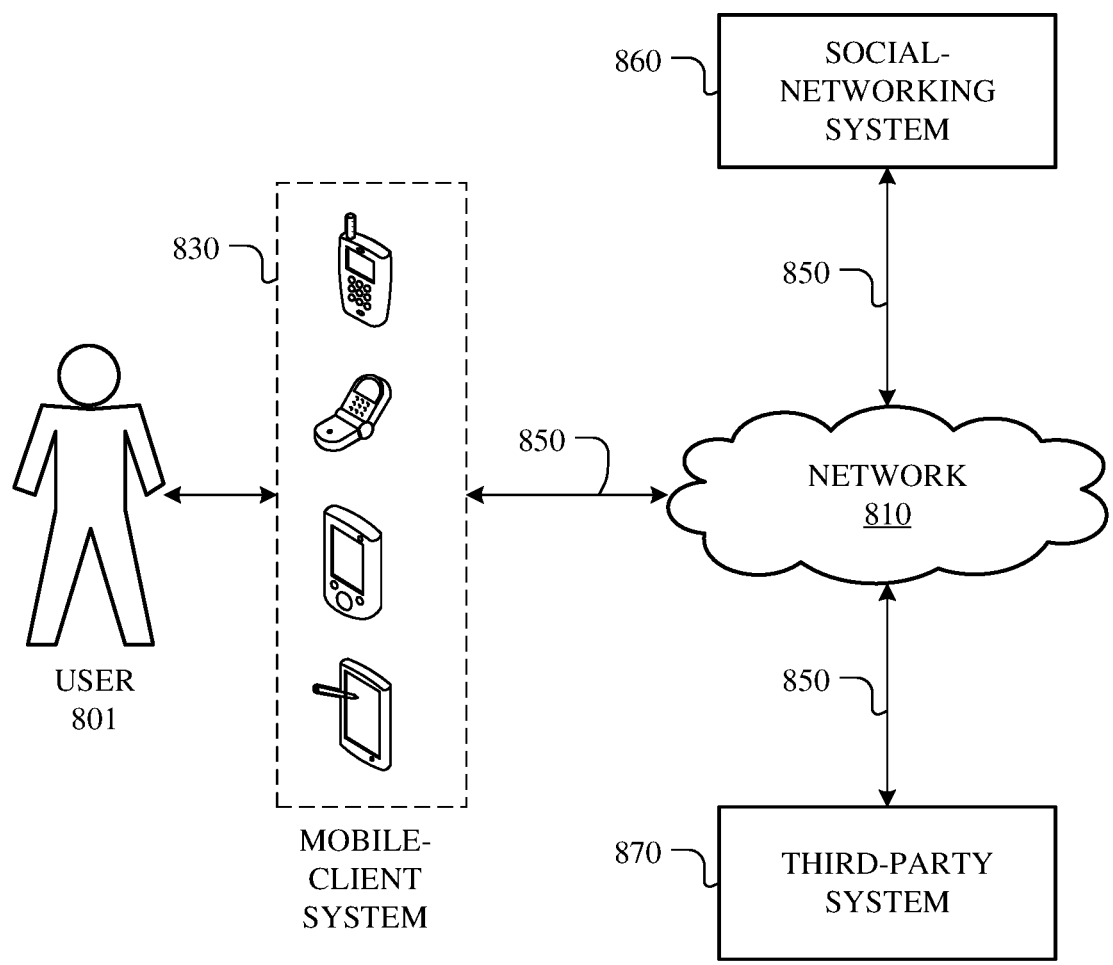
FIG. 8 illustrates an example network environment associated with a social-networking system.

FIG. 8 illustrates an example network environment 800 associated with a social-networking system. Network environment 800 includes a user 801, a client system 830, a social-networking system 860, and a third-party system 870 connected to each other by a network 810. Although FIG. 8 illustrates a particular arrangement of user 801, client system 830, social-networking system 860, third-party system 870, and network 810, this disclosure contemplates any suitable arrangement of user 801, client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of users 801, client systems 830, social-networking systems 860, third-party systems 870, and networks 810, this disclosure contemplates any suitable number of users 801, client systems 830, social-networking systems 860, third-party systems 870, and networks 810. As an example and not by way of limitation, network environment 800 may include multiple users 801, client system 830, social-networking systems 860, third-party systems 870, and networks 810.

In particular embodiments, user 801 may be an individual (human user), an entity (e.g., an enterprise, business, or third-party application), or a group (e.g., of individuals or entities) that interacts or communicates with or over social-networking system 860. In particular embodiments, social-networking system 860 may be a network-addressable computing system hosting an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. In particular embodiments, social-networking system 860 may include an authorization server (or other suitable component(s)) that allows users 801 to opt in to or opt out of having their actions logged by social-networking system 860 or shared with other systems (e.g., third-party systems 870), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 870 may be a network-addressable computing system that can host interfacing services between the social-network system 760 and broadcast providers (112/213). Third-party system 870 may generate, store, receive, and send set-top box and user information, such as, for example, personalized content items lists, user or set-top IDs, content items or content item package files. Third-party system 870 may be accessed by the other components of network environment 800 either directly or via network 810. In particular embodiments, one or more users 801 may use one or more client systems 830 to access, send data to, and receive data from social-networking system 860 or third-party system 870. Client system 830 may access social-networking system 860 or third-party system 870 directly, via network 810, or via a third-party system. As an example and not by way of limitation, client system 830 may access third-party system 870 via social-networking system 860. Client system 830 may be any suitable computing device, such as, for example, a personal computer, a laptop computer, a cellular telephone, a smartphone, a tablet computer, or an augmented/virtual reality device.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

Figure 9:
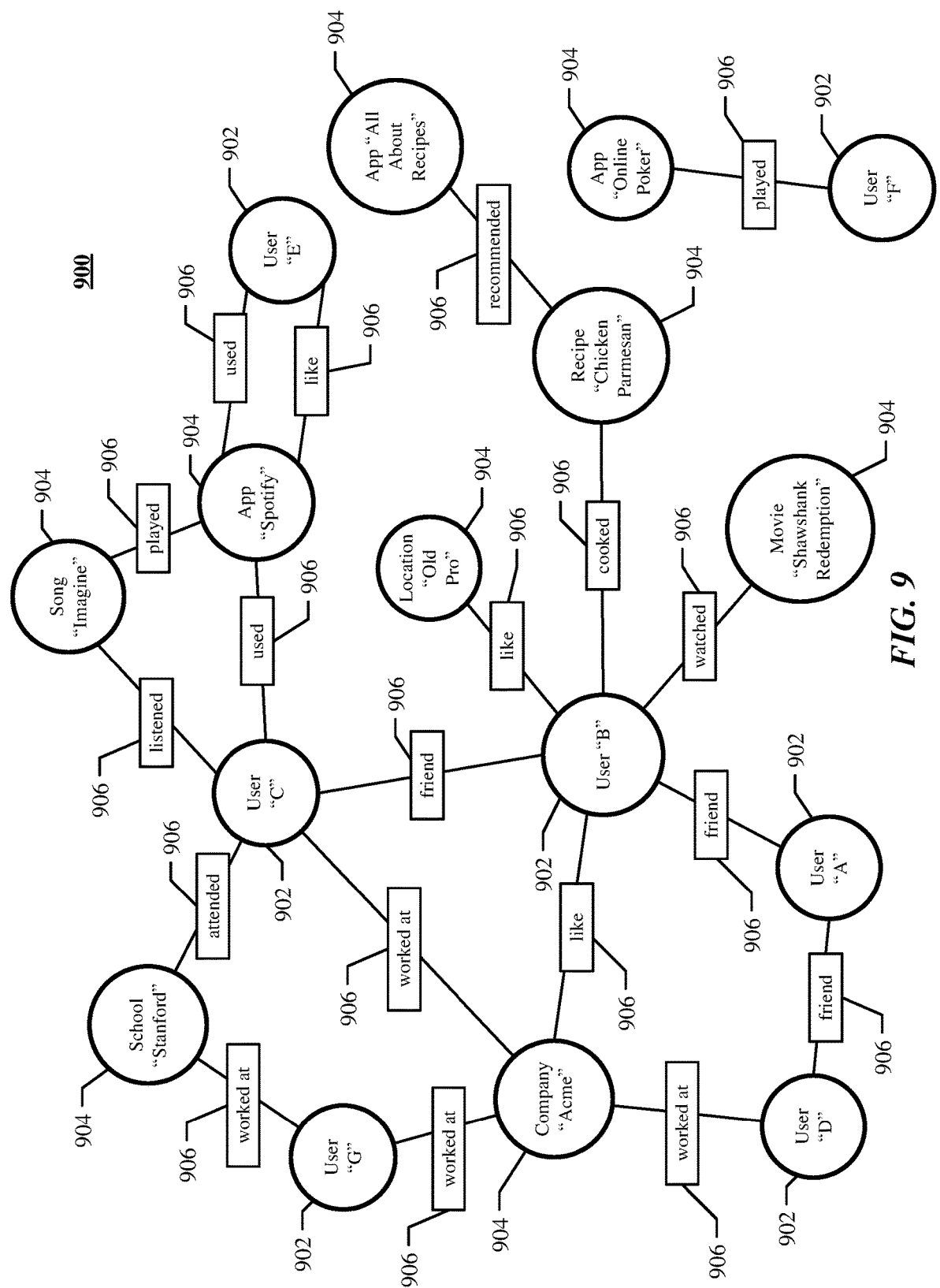
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Each node may be associated with a unique entity (i.e., user or concept), each of which may have a unique identifier (ID), such as a unique number or username. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party system 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906. The degree of separation between two objects represented by two nodes, respectively, is a count of edges in a shortest path connecting the two nodes in the social graph 900. As an example and not by way of limitation, in the social graph 900, the user node 902 of user "C" is connected to the user node 902 of user "A" via multiple paths including, for example, a first path directly passing through the user node 902 of user "B," a second path passing through the concept node 904 of company "Acme" and the user node 902 of user "D," and a third path passing through the user nodes 902 and concept nodes 904 representing school "Stanford," user "G," company "Acme," and user "D." User "C" and user "A" have a degree of separation of two because the shortest path connecting their corresponding nodes (i.e., the first path) includes two edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, social-networking system 860 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 870 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 860 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 860 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 860 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 860 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 860 may calculate a coefficient based on a user's actions. Social-networking system 860 may monitor such actions on the online social network, on a third-party system 870, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 860 may calculate a coefficient based on the user's actions with particular types of content. The content may be associated with the online social network, a third-party system 870, or another suitable system. The content may include users, profile pages, posts, news stories, headlines, instant messages, chat room conversations, emails, advertisements, pictures, video, music, other suitable objects, or any combination thereof. Social-networking system 860 may analyze a user's actions to determine whether one or more of the actions indicate an affinity for subject matter, content, other users, and so forth. As an example and not by way of limitation, if a user frequently posts content related to "coffee" or variants thereof, social-networking system 860 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 860 may calculate a coefficient based on the type of relationship between particular objects. Referencing the social graph 900, social-networking system 860 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 860 may determine that the user has a higher coefficient with respect to the first photo than the second photo because having a tagged-in-type relationship with content may be assigned a higher weight and/or rating than having a like-type relationship with content. In particular embodiments, social-networking system 860 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 860 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 860 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 830 of the user). A first user may be more interested in other users or concepts that are closer to the first user. As an example and not by way of limitation, if a user is one mile from an airport and two miles from a gas station, social-networking system 860 may determine that the user has a higher coefficient for the airport than the gas station based on the proximity of the airport to the user.

In particular embodiments, social-networking system 860 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 860 may provide information that is relevant to user's interests and current circumstances, increasing the likelihood that they will find such information of interest. In particular embodiments, social-networking system 860 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 860 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 860 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 870 (e.g., via an API or other communication channel), or from another suitable system. In response to the request, social-networking system 860 may calculate the coefficient (or access the coefficient information if it has previously been calculated and stored). In particular embodiments, social-networking system 860 may measure an affinity with respect to a particular process. Different processes (both internal and external to the online social network) may request a coefficient for a particular object or set of objects. Social-networking system 860 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 860 or shared with other systems (e.g., third-party system 870). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 870, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 862 may be authorization/privacy servers for enforcing privacy settings. In response to a request from a user (or other entity) for a particular object stored in a data store 864, social-networking system 860 may send a request to the data store 864 for the object. The request may identify the user associated with the request and may only be sent to the user (or a client system 830 of the user) if the authorization server determines that the user is authorized to access the object based on the privacy settings associated with the object. If the requesting user is not authorized to access the object, the authorization server may prevent the requested object from being retrieved from the data store 864 or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In particular embodiments, privacy settings may allow a first user to specify (e.g., by opting out, by not opting in) whether the social-networking system 860 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 860 may access such information in order to provide a particular function or service to the first user, without the social-networking system 860 having access to that information for any other purposes. Before accessing, storing, or using such objects or information, the social-networking system 860 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 860.

In particular embodiments, a user may specify whether particular types of objects or information associated with the first user may be accessed, stored, or used by the social-networking system 860. As an example and not by way of limitation, the first user may specify that images sent by the first user through the social-networking system 860 may not be stored by the social-networking system 860. As another example and not by way of limitation, a first user may specify that messages sent from the first user to a particular second user may not be stored by the social-networking system 860. As yet another example and not by way of limitation, a first user may specify that all objects sent via a particular application may be saved by the social-networking system 860.

In particular embodiments, privacy settings may allow a first user to specify whether particular objects or information associated with the first user may be accessed from particular client systems 830 or third-party systems 870. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 860 may provide default privacy settings with respect to each device, system, or application, and/or the first user may be prompted to specify a particular privacy setting for each context. As an example and not by way of limitation, the first user may utilize a location-services feature of the social-networking system 860 to provide recommendations for restaurants or other places in proximity to the user. The first user's default privacy settings may specify that the social-networking system 860 may use location information provided from a client device 130 of the first user to provide the location-based services, but that the social-networking system 860 may not store the location information of the first user or provide it to any third-party system 870. The first user may then update the privacy settings to allow location information to be used by a third-party image-sharing application in order to geo-tag photos.

In particular embodiments, privacy settings may allow a first user to specify whether particular objects or information associated with the first user may be collected from particular client systems 830 or third-party systems 870. The privacy settings may allow the first user to opt in or opt out of having objects or information collected from a particular device (e.g., a content rendering device), from a particular application (e.g., a messaging app), or from a particular system (e.g., an email server). The social-networking system 860 may provide default privacy settings with respect to each device, system, or application, and/or the first user may be prompted to specify a particular privacy setting for each context. As an example and not by way of limitation, the social-networking system 860 may provide a personalized content items via a broadcast service provider based on user-specific data collected by a content rendering device. The first user's default privacy settings may specify that the content rendering device may collect the user-specific data and provide the collected data to the social-networking system 860. The first user may then update the privacy settings to allow the content rendering device to collect only particular types of data associated with the first user or allow the content rendering device to collect no user-specific data associated with the first user. In particulate embodiments, all privacy-related and permissions-related features and functionality described herein with respect to the social-networking system may also be provided and applied separately with respect to the set-top box or may be provided and applied in combination or jointly with the set-top box.

Figure 10:
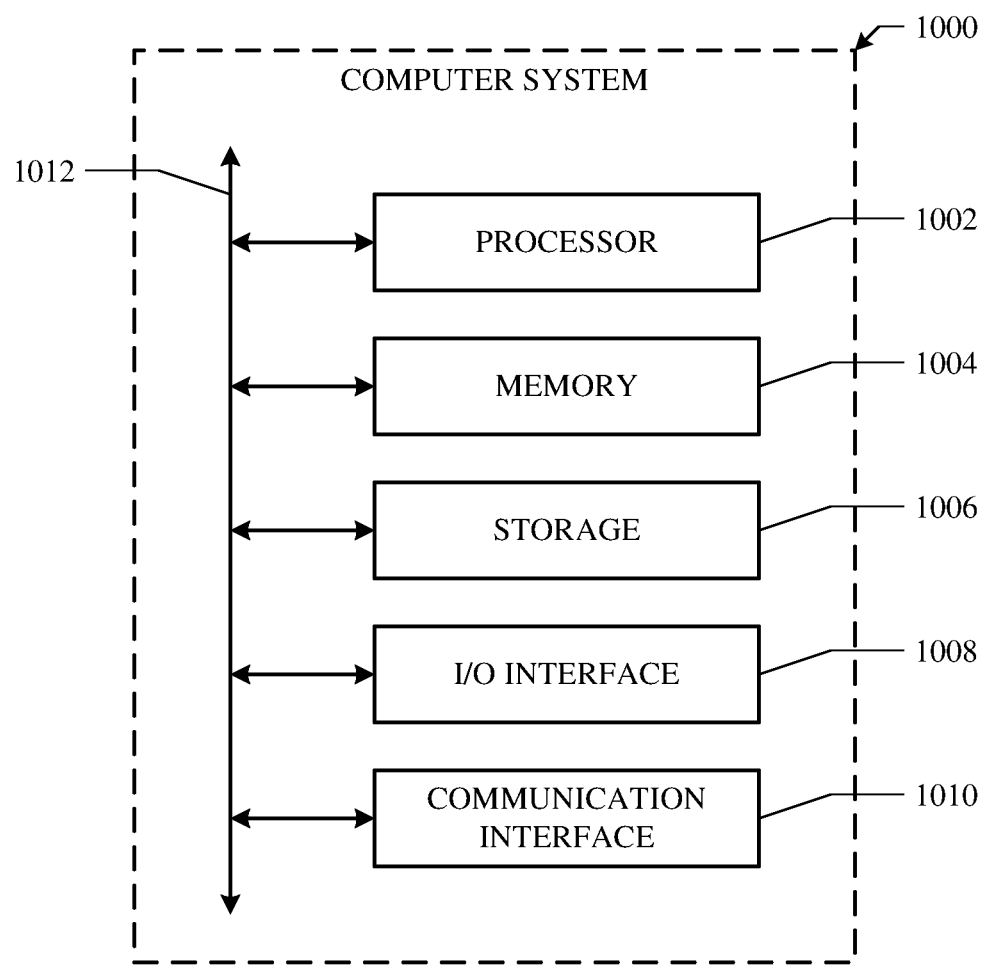
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
    receiving, by a computing device, from a set-top box associated with a user of an online social network, data associated with the user, wherein the set-top box receives signals for media content from a television broadcast service provider system, and wherein the set-top box renders media content to a media device associated with the user based on the received signals;
    identifying, by the computing device, personalized content items that are of interest to the user based at least on the received data associated with the user;
    sending, by the computing device, to the set-top box, information associated with the identified personalized content items, wherein the information associated with the identified personalized content items is used by the set-top box to determine which content items to cache;
    selecting, by the computing device, based at least on the identified personalized content items, one or more content objects to be sent to the set-top box by the television broadcast service provider using a television broadcast infrastructure; and
    sending, by the computing device, to the television broadcast service provider system, the selected one or more content objects, wherein the one or more content objects are sent to the set-top box by the television broadcast service provider system using the television broadcast infrastructure, and wherein the set-top box caches the one or more content objects based on the information associated with the identified personalized content items.

2. The method of claim 1, wherein the data associated with the user comprises user descriptive data or interaction data between the user and the set-top box.

3. The method of claim 2, wherein the user descriptive data comprises social group memberships, social demographic information, or local geographic information.

4. The method of claim 2, wherein the interaction data between the user and the set-top box comprises content viewing history, questionnaire data, posts, like submissions, or dislike submissions.

5. The method of claim 1, wherein the media device comprises a television, a radio, a tablet, or a computer.

6. The method of claim 1, wherein the identifying the personalized content items is further based on user-profile data or on a social graph available in the online social network.

7. The method of claim 1, wherein the identifying the personalized content items is done by a machine-learning algorithm.

8. The method of claim 1, wherein the set-top box determines whether to cache a content item based at least on the personalized content items received from the computing device, wherein the set-top box presents a list of cached content items to the user, and wherein the set-top box presents a cached content item to the user upon receiving a request for the cached content item from the user.

9. The method of claim 1, further comprising:
    sending, by the computing device, to the television broadcast service provider system, the identified personalized content items and an identifier corresponding to the user, wherein the television broadcast service provider system tags content items belonging to the personalized content items with the identifier corresponding to the user, wherein the set-top box determines that the tagged content items belong to the personalized content items based on the identifier.

10. The method of claim 1, wherein the content objects comprise newsfeeds, posts, pictures, videos, local news, maps, or a subset of the Internet.

11. The method of claim 1, wherein the television broadcast service provider system sends the one or more content objects to the set-top box during off-peak hours.

12. The method of claim 1, wherein the set-top box is associated with more than one users of the online social network.

13. The method of claim 12, wherein the set-top box is connected to a plurality of sub-rendering devices, wherein each of the plurality of sub-rendering devices is associated with a user.

14. One or more computer-readable non-transitory storage media embodying software that is operable when executed to:
    receive, from a set-top box associated with a user of an online social network, data associated with the user, wherein the set-top box receives signals for media content from a television broadcast service provider system, and wherein the set-top box renders media content to a media device associated with the user based on the received signals;
    identify personalized content items that are of interest to the user based at least on the received data associated with the user;
    send, to the set-top box, information associated with the identified personalized content items, wherein the information associated with the identified personalized content items is used by the set-top box to determine which content items to cache;
    select, based at least on the identified personalized content items, one or more content objects to be sent to the set-top box by the television broadcast service provider using a television broadcast infrastructure; and
    send, to the television broadcast service provider system, the selected one or more content objects, wherein the one or more content objects are sent to the set-top box by the television broadcast service provider system using the television broadcast infrastructure, and wherein the set-top box caches the one or more content objects based on the information associated with the identified personalized content items.

15. The media of claim 14, wherein the data associated with the user comprises user descriptive data or interaction data between the user and the set-top box.

16. The media of claim 15, wherein the user descriptive data comprises social group memberships, social demographic information, or local geographic information.

17. The media of claim 15, wherein the interaction data between the user and the set-top box comprises content viewing history, questionnaire data, posts, like submissions, or dislike submissions.

18. The media of claim 14, wherein the media device comprises a television, a radio, a tablet, or a computer.

19. The media of claim 14, wherein the identifying the personalized content items is further based on user-profile data or on a social graph available in the online social network.

20. A system comprising:
one or more processors; and
one or more computer-readable non-transitory storage media coupled to one or more of the processors and comprising instructions operable when executed by one or more of the processors to cause the system to:
receive, from a set-top box associated with a user of an online social network, data associated with the user, wherein the set-top box receives signals for media content from a television broadcast service provider system, and wherein the set-top box renders media content to a media device associated with the user based on the received signals;
identify personalized content items that are of interest to the user based at least on the received data associated with the user;
send, to the set-top box, information associated with the identified personalized content items, wherein the information associated with the identified personalized content items is used by the set-top box to determine which content items to cache;
select, based at least on the identified personalized content items, one or more content objects to be sent to the set-top box by the television broadcast service provider using a television broadcast infrastructure; and
send, to the television broadcast service provider system, the selected one or more content objects, wherein the one or more content objects are sent to the set-top box by the television broadcast service provider system using the television broadcast infrastructure, and wherein the set-top box caches the one or more content objects based on the information associated with the identified personalized content items.

* * * * *